Figure 2:
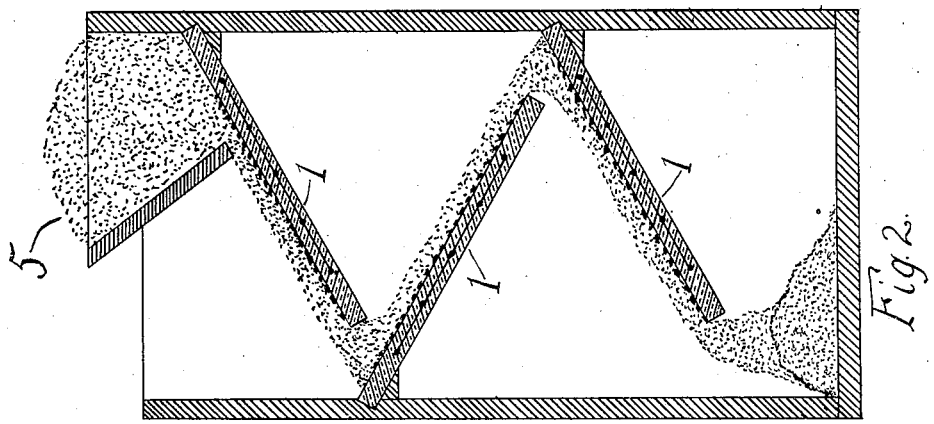

No. 865,711. PATENTED SEPT. 10, 1907.
I. KITSEE.
SEPARATING METAL FROM DEPOSITS.
APPLICATION FILED JUNE 20, 1907.

2 SHEETS—SHEET 1.

WITNESSES: INVENTOR.

No. 865,711. PATENTED SEPT. 10, 1907.
I. KITSEE.
SEPARATING METAL FROM DEPOSITS.
APPLICATION FILED JUNE 20, 1907.
2 SHEETS—SHEET 2.
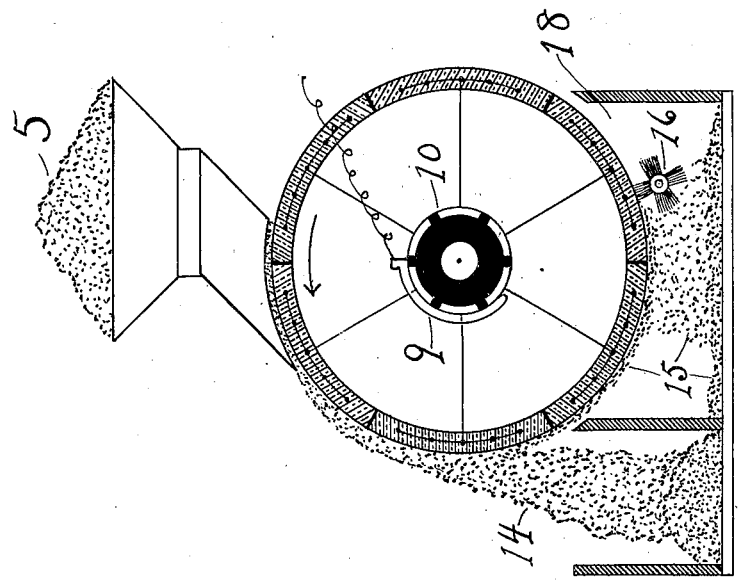
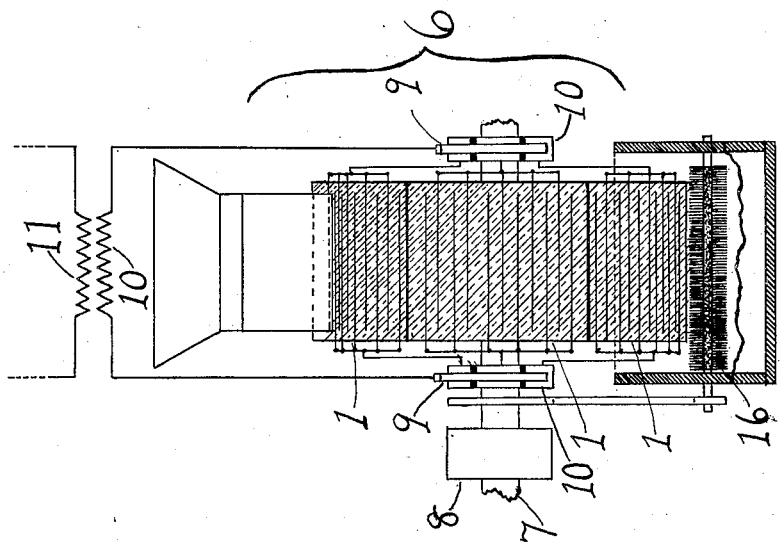
WITNESSES:
INVENTOR.

UNITED STATES PATENT OFFICE.

ISIDOR KITSEE, OF PHILADELPHIA, PENNSYLVANIA.

SEPARATING METAL FROM DEPOSITS.

No. 865,711.      Specification of Letters Patent.      Patented Sept. 10, 1907.

Application filed June 20, 1907. Serial No. 379,912.

*To all whom it may concern:*

Be it known that I, ISIDOR KITSEE, a citizen of the United States, residing at Philadelphia, in the county of Philadelphia and State of Pennsylvania, have invented certain new and useful Improvements in Separating Metal from Deposits, of which the following is a specification.

My invention relates to an improvement in separating metals from the natural deposits. Its object is, to separate such metals in an efficient and simple manner.

My invention is applicable to different kinds of metals, but its great value is apparent in separating precious metal from its ore.

To separate iron from ore or sand, the material carrying the iron is carried in the region of magnetic or electro-magnetic devices, and the iron particles are caused to be deflected by magnetic force. To separate such metal, as is not paramagnetic, it was thought possible to present one pole of a circuit carrying a high electro-motive force to the material carrying such metal and it was even suggested to produce a sparkless arc between two points of such circuit and carry the material through said arc, thereby deflecting such material from the non-conductor carrying the same. Both of these suggestions proved unsatisfactory, so also was the suggestion, to make use of the repelling force between a charged conductor and the mixture containing conducting particles, abandoned.

In my experiments, I have found that if one electrode of a high tension current (electro-magnetic or static) is presented to finely divided metallic bodies, intermixed with non-conductors, the metallic particles are first attracted and then repelled from this electrode. The action is easily understood. As long as the particles of metal are at zero, they are attracted, but as soon as they have acquired the potential of the electrode, they are repelled. This repelling action prevents the employment of the electrode, for the purpose of separating the metal from its deposit. When two electrodes of a high inductive current are separated by an air space and the material carrying the metallic particles is carried through said air space, a motion—independent of the motion due to gravity—, is induced in the metallic particles. This motion may carry the same a certain distance away from the non-conducting deposit, but yet is not sufficient to separate the metal from the ore or sand, and after careful examination, such method had to be abandoned by me. In the further course of experiments, I find that if both electrodes of such a circuit are placed in proximity to each other and on a non-conducting body, the metallic particles will remain between the two electrodes. The reason, therefore, is that each particle is charged positively and negatively in succession. But the great disadvantage arises, that in over-bridging the space between the two electrodes, arcing and sparking cannot be avoided, and in my experiments, it often happened that the metallic particles were welded on, so to speak, and could hardly be taken off with the aid of a scraping tool. The further disadvantage is, that when the electrodes are firmly connected to each other through one or the other of the particles being welded thereon, their use was entirely gone. To obviate this difficulty, I had recourse to an arrangement whereby both electrodes were embedded in a non-conducting material and where the ore or sand carrying the metallic particles, was brought in contact with the non-conducting surface of the embedded electrodes. This arrangement proved satisfactory and I was enabled to extract from sand, particles of metal, which could not have been extracted otherwise, than with the aid of a chemical liquid.

As it is necessary for me to provide means, so that persons versed in the art may carry out my invention, I have illustrated the same in the accompanying drawing in two different forms, but it is obvious that the mechanical arrangement of the devices may differ without departing from the scope of my invention.

Figure 1:
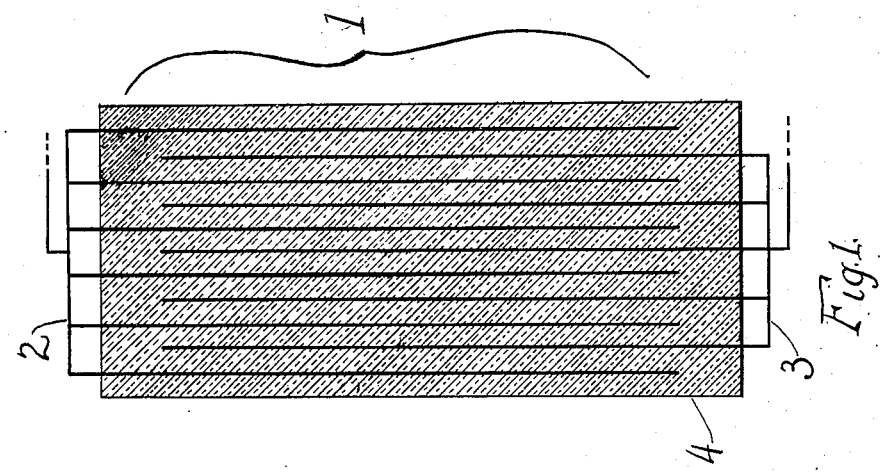

In the drawing, Figure 1 is a plan view of one of the devices embodying my invention. Fig. 2 is a sectional view of an apparatus showing my invention in operation. Fig. 3 is a front elevation and Fig. 4 a side elevation of an apparatus in modified form.

1 is the device as an entirety comprising the two electrodes 2 and 3 and the non-conductor 4. I have found, that wires embedded in a glass plate answer practically the purpose most satisfactory and I have illustrated this method of accomplishing my object in Fig. 1. It will be noted that in Fig. 1, one of the electrodes is carried out of the insulating material at one end and the second of the electrodes is carried out of the insulating material at the opposite end. This for the purpose, that the terminals of the electrodes shall not be in too close proximity to each other.

In Fig. 2, 5 is the material to be treated. In this figure, I made use of a series of devices, such as shown in Fig. 1, and I call each of said devices one unit. Fig. 2, therefore, comprises three units; but it is obvious that any number of units may be placed in a manner, so that the material to be operated on should pass over two, three, or more of these units.

In Fig. 3 and 4 the apparatus comprises a series of such units supported by a frame in the shape of a drum, journaled at 7, and provided with the means 8 to rotate the same with the aid of an electric, or any other mechanical motor.

The drum is supposed to be rotated in the direction of the arrow. The material 5 to be treated is carried over part of the surface of said drum and the metallic particles, intermixed with said material, adhere to the surface and are carried to the inclosure 18, where they are brushed off with means, such as are shown here and designated by the numeral 16. I have also designated the separated metal by the numeral 15 and the non-conducting material, minus the metal, by the numeral 14. It has to be noted here, that only parts of the units, with which the drum is surfaced, are at one and the same time in contact with the current carrying circuit. This for the reason, that when these units have reached the inclosure where it is desired to collect the metallic particles from the surface, the strong adherence between the particles and surface should be broken.

The device is provided with the commutator 10, so as to carry out the idea of alternately placing alternate sections in contact and out of contact with the circuit carrying the current.

In Figs. 3 and 4, I have designated the device as an entirety by the numeral 6.

Having now described my invention, what I claim as new and desire to secure by Letters Patent is:—

1. The method of separating particles of metal from natural deposits, which consists in carrying the mixture of metallic particles and natural deposits over surface of a non-conducting material having embedded therein both electrodes of a high tension circuit.

2. The process of separating conducting particles from non-conducting particles, consisting in passing a stream of the commingled particles intermediately of and in proximity to high tension electrodes of opposite sign; protecting said particles from acquired charges, whereby the conducting particles are detained and the non-conducting particles are discharged, and subsequently freeing and collecting the conducting particles.

3. The method of separating conducting particles from non-conducting particles, which consists in carrying the mixture containing both particles over the non-conducting surface of high tension electrodes of opposite sign, whereby the conducting particles remain attached to said non-conducting surface, allowing the non-conducting particles to separate by gravity.

4. Means to separate metals from non-conducting material, said means comprising two electrodes of opposite signs in proximity to each other, said electrodes insulated from each other and means to carry said material over the insulation of said electrodes.

5. Means to separate conductors from non-conductors, said means comprising two electrodes connected to a circuit carrying a high tension current, said electrodes separated from each other, a non-conducting covering for the surface of said electrodes and means to carry the mixture of conductors and non-conductors over said non-conducting covering.

6. The method, which consists in causing the separation of non-conducting from conducting bodies through the static action of two electrodes connected to a high tension current on the conducting bodies, thereby causing said bodies to remain positioned between said two electrodes.

In testimony whereof I affix my signature in presence of two witnesses.

ISIDOR KITSEE.

Witnesses:
  MARY C. SMITH,
  EDITH R. STILLEY.